United States Patent [19]

Itaba et al.

[11] Patent Number: 5,045,620

[45] Date of Patent: Sep. 3, 1991

[54] ORIENTED POLYETHYLENE FILM AND PRODUCTION THEREOF

[75] Inventors: Yasushi Itaba; Yutaka Yoshifuji; Takayoshi Kondo; Ichiro Sakamoto, all of Kanagawa, Japan

[73] Assignee: Tonen Sekiyukagaku K.K., Tokyo, Japan

[21] Appl. No.: 404,100

[22] Filed: Sep. 7, 1989

[30] Foreign Application Priority Data

Sep. 8, 1988 [JP] Japan ................................ 63-223640

[51] Int. Cl.$^5$ ........................ C08F 10/02; B29C 35/08
[52] U.S. Cl. ................................ 526/348.1; 428/516; 428/910; 264/22; 264/288.4; 264/288.8; 264/291; 264/331.17; 264/345; 522/161; 525/240
[58] Field of Search ...................... 526/348.1; 264/164, 264/171, 291, 345, 331.17, 22, 288.4, 288.8; 522/161; 428/516, 910

[56] References Cited

U.S. PATENT DOCUMENTS 4,226,905 10/1980 Harbourne ................... 526/348.1 X
4,258,166  3/1981 Canterino et al. ............... 526/348.1
4,705,714 11/1987 Itaba et al. ................... 526/348.1 X

OTHER PUBLICATIONS

Polymer Chemistry, Seymour et al. (2nd ed.) Marcel Dekker, Inc.; N.Y., xii-xiii, 1988.

Primary Examiner—Fred Teskin
Attorney, Agent, or Firm—Kenyon & Kenyon

[57] ABSTRACT

Disclosed are oriented polyethylene films having specific elongation and strength, which are excellent in linear tearability and clear tearability, suitably used for packaging and produced by longitudinally stretching a polyethylene resin sheet in which the degree of cross-linking inwardly decreases across the thickness thereof at a draw ratio of at least 5 times at a temperature of not higher than the melting point of a polyethylene resin forming the polyethylene resin sheet, and laterally stretching said sheet 4 to 8 times at a temperature ranging from above the melting point of the polyethylene resin up to 10° C. higher than the melting point thereof.

3 Claims, No Drawings

ORIENTED POLYETHYLENE FILM AND PRODUCTION THEREOF

BACKGROUND OF THE INVENTION

The present invention relates to an oriented polyethylene film and a process for producing the same, particularly to a biaxially oriented polyethylene film excellent in tearability and a process for producing the same by biaxially stretching a polyethylene sheet crosslinked in a specific manner, under specific conditions.

In the fields of food packaging and drug packaging, packages such as standing pouches and portioned packs are required to be longitudinally linearly tearable at their cut lines. For such applications, longitudinally uniaxially oriented polyethylene films have previously been used. These films are excellent in linear tearability in their stretched direction. However, these films have the disadvantage of providing unclear cut lines and hence being inferior in clear tearability, because the films are generally stretched at high draw ratios, which causes the films to be fibrillated, and therefore fibrils are liable to be produced on tearing.

On the other hand, rolled oriented polyethylene films are commercially available for these applications. These films are characterized by depressed occurrence of fibrils and good tearability in a longitudinal direction, but have the disadvantage that the longitudinal strength is not balanced with the lateral strength.

Furthermore, in order to improve the inferior clarity of prior-art films formed of polyethylene produced by a medium- or high-pressure process, there has been proposed a process comprising crosslinking homogeneously a film formed of an ethylenic resin such as polyethylene by radiation and then stretching biaxially the crosslinked film (Japanese Patent Pablication No. 18893/1962). This film is improved in clarity, but insufficient in moistureproofness. Hence, for purposes in which better moistureproofness is required, the improvement in moistureproofness has been desired.

Then, the present inventors have previously proposed an oriented polyethylene film in which the degree of crosslinking inwardly decreases across the thickness of the film (Japanese Patent Unexamined Publication Nos. 174322/1984, 74819/1986 and 74820/1986). This oriented film is composed of both crosslinked outer layers and an uncrosslinked intermediate layer, and can meet the excellent moistureproofness requirement described above. It is unnecessary to provide further a carrier layer or to increase the thickness of the film for the purpose of improving the moistureproofness. This oriented film has therefore various advantages that the clarity and the packaging properties of the film are not deteriorated.

The above-mentioned oriented film proposed by the present inventors is produced by stretching a rolled sheet preferably at a temperature ranging from the softening point of a raw material resin to the melting point thereof. However, the oriented film obtained under such conditions is somewhat insufficient in terms of the possession of both the linear tearability and the clear tearability described above, particularly for the application of standing pouches or the like in which it is required to have both these properties. Furthermore, the longitudinal elongation and strength (tearing strength) are insufficiently balanced with the lateral elongation and strength (tearing strength), respectively.

SUMMARY OF THE INVENTION

It is therefore a primary object of the present invention to provide an oriented polyethylene film having excellent properties, whereby the prior-art disadvantages can be overcome.

Another object of the present invention is to provide an improved process for producing an oriented polyethylene film having excellent properties.

Other objects will be apparent from the following description.

According to the present invention to attain these objects, there are provided (1) an oriented polyethylene film having a longitudinal elongation of not more than 75% and a lateral elongation of 50 to 300%, said longitudinal elongation being lower than said lateral elongation, (2) an oriented polyethylene film having a longitudinal tearing strength of not more than 25 g/mm, said longitudinal tearing strength being lower than said lateral tearing strength, and (3) a process for producing an oriented polyethylene film comprising the steps of longitudinally stretching a polyethylene resin sheet in which the degree of crosslinking inwardly decreases across the thickness thereof at a draw ratio of at least 5 times at a temperature of not higher than the melting point of a polyethylene resin forming the polyethylene resin sheet, and laterally stretching said sheet at a draw ratio of 4 to 8 times at a temperature ranging from above the melting point of the polyethylene resin up to 10° C. higher than the melting point thereof.

DESCRIPTION OF THE PREFERRED EMBODIMENTS

According to the eager studies of the present inventors, the above-mentioned oriented film (biaxially oriented film) in which the degree of crosslinking inwardly decreases across the thickness of the film is characterized by excellent clear tearability. It has become clear that an oriented polyethylene film excellent in both the clear tearability and the longitudinal linear tearability can be obtained by stretching a polyethylene resin sheet at a temperature and a draw ratio each having a specific range, taking advantage of the characteristic described above and further contemplating that the linear tearability depends on the balance between the longitudinal strength and elongation and the longitudinal strength and elongation, respectively.

The present invention will hereinafter be described in detail.

The oriented polyethylene film of the present invention is obtained by stretching the polyethylene resin sheet in which the degree of crosslinking inwardly decreases across the thickness thereof.

As polyethylene resins forming the above resin sheets can be mentioned ethylene homopolymers or ethylene copolymers having a density of at least 0.935 g/cm$^3$ and a melt index (JIS K 6760, measured at a temperature of 190° C. and a load of 2.16 kg, hereinafter referred to as MI) of at least 0.05 g/10 minutes, preferably 0.5 to 20 g/10 minutes. Examples of such homopolymers or copolymers include high or medium density polyethylene and copolymers of ethylene of at least 50% by weight and α-olefins such as propylene, 1-butene, 1-pentene, 1-hexene, 4-methyl-1-pentene and 1-octene, or vinyl monomers such as vinyl acetate, (meta)acrylic acid, (meta)acrylic esters, acrylic amides, acrylonitrile, styrene and vinyl chloride. These polyethylene resins are used alone or as mixtures of at least two kinds. These polyethylene resins may be incorporated with known additives such as antioxidants, UV absorbers, antiblocking agents, slip agents, neutralizers, nucleating agents, pigments and dyes, as so desired.

The above crosslinked polyethylene resin sheets are disclosed in Japanese Patent Unexamined Publication No. 74819/1986 previously described and the like, and are produced by suitable application of the methods disclosed therein. The detailed description is therefore omitted. For example, the above polyethylene resin sheet specified in the degree of crosslinking can be obtained by a method in which a flat stock sheet extruded from a T-die is irradiated by electron beams on both sides thereof in such a manner that the degree of crosslinking inwardly decreases from both the sides thereof.

The degree of crosslinking is expressed in terms of gel fraction defined by the quantity of insoluble matters which are left undissolved when a sample is extracted with boiling p-xylene. The gel fraction of an inner layer portion where the degree of crosslinking is lowest is preferably less than 5%, and the gel fraction of opposite outer layer portions where the degree of crosslinking is highest is preferably 5% or more. More preferably, the gel fraction of the inner layer portion is 0%, the gel fraction of the opposite outer layer portions is 20 to 70%, both the outer layer portions have the same degree of crosslinking, and there are formed crosslinked layer/uncrosslinked layer/crosslinked layer in the thickness direction of the sheet, the ratio of the uncrosslinked layer: each of the crosslinked layers being 1:0.1 to 10.

The above-mentioned stretching is carried out by sequential biaxial stretching in which longitudinal stretching is first performed and then lateral stretching is conducted.

The longitudinal stretching is carried out at a draw ratio of at least 5 times at a stretching temperature of not higher than the melting point of the polyethylene resin, and the lateral stretching is accomplished at a draw ratio of 4 to 8 times at a stretching temperature ranging from above the melting point of the polyethylene resin up to 10° C. higher than the melting point thereof.

The film satisfying the longitudinal linear tearability and the clear tearability can not be obtained until these conditions are met. As shown also in Examples and Comparative Examples which will hereinafter be described, even if the draw ratio is within the range specified in the present invention, the longitudinal linear tearability is inferior at a lateral stretching temperature of lower than the melting point of the polyethylene resin, and similarly at a lateral stretching temperature exceeding 10° C. higher than the melting point thereof. In the case of the former, it sometimes happens that the film is ruptured depending on the draw ratio. Furthermore, even if both the longitudinal stretching temperature and the lateral stretching temperature are within the range specified in the present invention, the longitudinal linear tearability is inferior at a longitudinal or lateral draw ratio of lower than 5 times or higher than 8 times. In any event, the film satisfying both the clear tearability and the longitudinal linear tearability can not be obtained.

As to the longitudinal elongation and the lateral elongation of the film obtained by the above stretching method of the present invention, when the longitudinal elongation is lower than the lateral elongation, the film is good in longitudinal linear tearability. Hence, in order to satisfy both the longitudinal linear tearability and the clear tearability, the longitudinal elongation of the film is required to be lower than the lateral elongation thereof.

In this case, it is also required that the longitudinal elongation is not more than 75%, preferably not more than 60%, and the lateral elongation is within the range of 50% to 300%. The longitudinal elongation of the film obtained at a lateral stretching temperature of lower than the melting point of the polyethylene resin is higher than the lateral elongation thereof, which is less than 50%. Furthermore, when the longitudinal stretching temperature described above exceeds 10° C. higher than the melting point of the polyethylene resin, or when the draw ratio deviates from the range specified in the present invention, the longitudinal elongation of the film is higher than the lateral elongation thereof, or the longitudinal elongation is more than 75% and the lateral elongation is less than 50%.

On the other hand, as to the longitudinal tearing strength and the lateral tearing strength of the film obtained by the above stretching method of the present invention, when the film meets the condition that the longitudinal tearing strength is lower than the lateral tearing strength, the film satisfying both the longitudinal linear tearability and the clear tearability can be obtained. In this case, the longitudinal tearing strength is required to be not more than 25 g/mm. For example, even if the film has a lateral tearing strength of 35 g/mm and a longitudinal tearing strength of 26 g/mm, and meets the condition that the longitudinal tearing strength is lower than the lateral tearing strength, the film satisfying both the longitudinal linear tearability and the clear tearability can not be obtained because of the longitudinal tearing strength exceeding 25 g/mm.

Thus, the polyethylene resin sheet in which the degree of crosslinking inwardly decreases across the thickness of the sheet is longitudinally stretched so as to give a longitudinal elongation within a specific range and further laterally stretched at a specific draw ratio at a stretching temperature within a specific range without a substantial reduction of longitudinal molecular orientation, thereby obtaining the biaxially oriented film having controlled longitudinal elongation and lateral elongation. Such a film is excellent in both the longitudinal linear tearability and the clear tearability, and expected to be widely used for packaging. Also, this film has clarity, moistureproofness, balanced elongation and balanced tearing strength, and therefore particularly useful for standing pouches and portioned packs. The biaxially oriented film having controlled longitudinal tearing strength and lateral tearing strength is similar to that described above.

The present invention will be described in more detail with reference to the following Examples and Comparative Examples.

The test methods employed in the present invention are as follows:

(1) Gel fraction: In accordance with ASTM D2765, Method A (2) Tearability:

Linear tearability

When cutting I-type notch by hands, a linearly cut sample was indicated by ◯, and others by X.

Clear tearability

When cutting, a sample giving a clear cut section was indicated by ◯, a sample giving a slightly notched section by △, and others by X.

(3) Elongation: In accordance with JIS C2313

(4) Tearing strength: In accordance with JIS P8116
The value of tearing strength of 16 films divided by the thickness of the films (20×16=320 microns when the thickness of one film is 20 microns)

(5) High load melt index (HLMI): In accordance with JIS K6760 (measured at a load of 21.6 kg)

EXAMPLE 1

High density polyethylene having a density of 0.953 g/cm³, an MI of 0.8 g/10 minutes, HLMI/MI of 26.4 and a melting point of 132° C. was formed into a stock sheet having a thickness of 0.84 mm. Both the surfaces of this stock sheet were irradiated by electron beams of 15 Mrad under the condition of 200 KV to obtain a irradiated stock sheet composed of three layers, cross-linked outer layer/uncrosslinked inner layer/crosslinked outer layer (hereinafter referred to as C/U/C), in which the ratio of their thickness was 1:1.5:1 and their gel fractions were 50%/0%/50%. This irradiated stock sheet was longitudinally stretched 6 times at a temperature of 125° C., and then laterally stretched 7 times at a temperature of 137° C. to obtain a 20 micron-thick oriented film. The results are shown in Table 1.

EXAMPLE 2

An oriented film was obtained in the same manner as with Example 1 except that a 700 micron-thick stock sheet was longitudinally stretched 5 times and the irradiation voltage of the electron beams was changed.
The results are shown in Table 1.

EXAMPLE 3

An oriented film was obtained in the same manner as with Example 1 except that the irradiated stock sheet was longitudinally stretched 7 times and laterally stretched 6 times.
The results are shown in Table 1.

EXAMPLE 4

An oriented film was obtained in the same manner as with Example 1 except that a 630 micron-thick stock sheet was used to form the 15 micron-thick oriented film.
The results are shown in Table 1.

EXAMPLE 5

An oriented film was obtained in the same manner as with Example 1 except that a 1050 micron-thick stock sheet having the ratio of the thickness of C/U/C of 1:2.5:1 was used to form the 25 micron-thick oriented film.
The results are shown in Table 1.

EXAMPLE 6

An oriented film was obtained in the same manner as with Example 1 except that high density polyethylene having a density of 0.957 g/cm³, an MI of 1.0 g/10 minutes, HLMI/MI of 45.6 and a melting point of 134° C. was used, the ratio of the thickness of C/U/C was 1:2.5:1, and their gel fractions were 48%/0%/48%.
The results are shown in Table 1.

COMPARATIVE EXAMPLE 1

An oriented film was obtained in the same manner as with Example 1 except that a 700 micron-thick stock sheet was longitudinally stretched 5 times and laterally stretched at a temperature of 130° C.
The results are shown in Table 1.

COMPARATIVE EXAMPLE 2

An oriented film was obtained in the same manner as with Example 1 except that the stock sheet was laterally stretched at a temperature of 150° C.
The results are shown in Table 1.

COMPARATIVE EXAMPLE 3

An oriented film was obtained in the same manner as with Example 1 except that the stock sheet was longitudinally stretched 7 times and laterally stretched 6 times at a temperature of 130° C.
The results are shown in Table 1.

COMPARATIVE EXAMPLE 4

An oriented film was obtained in the same manner as with Example 1 except that a 700 micron-thick stock sheet was longitudinally stretched 4 times and laterally stretched 8.8 times.
The results are shown in Table 1.

TABLE 1

| | Polyethylene | | | Thickness of Stock Sheet (μm) | C/U/C (Ratio) | Degree of Crosslinking of Stock Sheet | | |
|---|---|---|---|---|---|---|---|---|
| | | | | | | Gel Fraction | | |
| | Density (g/cm³) | MI (g/10 min.) | HLMI/MI | | | Irradiated Surface (%) | Minimum (%) | Irradiated Surface (%) |
| Example No. | | | | | | | | |
| 1 | 0.953 | 0.8 | 26.4 | 840 | 1:1.5:1 | 50 | 0 | 50 |
| 2 | 0.953 | 0.8 | 26.4 | 700 | 1:1.5:1 | 50 | 0 | 50 |
| 3 | 0.953 | 0.8 | 26.4 | 840 | 1:1.5:1 | 50 | 0 | 50 |
| 4 | 0.953 | 0.8 | 26.4 | 630 | 1:1.5:1 | 50 | 0 | 50 |
| 5 | 0.953 | 0.8 | 26.4 | 1050 | 1:2.5:1 | 50 | 0 | 50 |
| 6 | 0.957 | 1.0 | 45.6 | 840 | 1:2.5:1 | 48 | 0 | 48 |
| Comparative Example No. | | | | | | | | |
| 1 | 0.953 | 0.8 | 26.4 | 700 | 1:1.5:1 | 50 | 0 | 50 |
| 2 | 0.953 | 0.8 | 26.4 | 840 | 1:1.5:1 | 50 | 0 | 50 |
| 3 | 0.953 | 0.8 | 26.4 | 840 | 1:1.5:1 | 50 | 0 | 50 |
| 4 | 0.953 | 0.8 | 26.4 | 700 | 1:1.5:1 | 50 | 0 | 50 |

| Stretching Conditions | | | Oriented Film | Oriented Film | | Tearing Strength | | Tearability | |
|---|---|---|---|---|---|---|---|---|---|
| Temperature (°C.) | | Draw Ratio | | Elongation | | | | | |
| MD* | TD** | MD* | TD** | Thickness (μm) | MD* | TD** | MD* | TD** | Linear MD* | Clear MD* |

TABLE 1-continued

| Example No. | | | | | | | | | | | |
|---|---|---|---|---|---|---|---|---|---|---|---|
| 1 | 125 | 137 | 6 | 7 | 20 | 50 | 65 | 12.5 | 30 | ○ | ○ |
| 2 | 125 | 137 | 5 | 7 | 20 | 70 | 85 | 15 | 40 | ○ | ○ |
| 3 | 125 | 137 | 7 | 6 | 20 | 40 | 100 | 10 | 60 | ○ | ○ |
| 4 | 125 | 137 | 6 | 7 | 15 | 45 | 60 | 12 | 28 | ○ | ○ |
| 5 | 125 | 137 | 6 | 7 | 25 | 55 | 70 | 14 | 35 | ○ | ○ |
| 6 | 125 | 137 | 6 | 7 | 20 | 45 | 60 | 11 | 28 | ○ | ○ |
| Comparative Example No. | | | | | | | | | | | |
| 1 | 125 | 130 | 5 | 7 | 20 | 90 | 35 | 15 | 12 | X | ○ |
| 2 | 125 | 150 | 6 | 7 | 20 | 100 | 70 | 26 | 35 | X | X |
| 3 | 125 | 130 | 7 | 6 | 20 | Ruptured | | | | — | — |
| 4 | 125 | 137 | 4 | 8.8 | 20 | 160 | 60 | 17 | 20 | X | ○ |

MD*: Longitudinal direction
TD**: Lateral direction

We claim:

1. An oriented and differentially crosslinked film of a material selected from the group consisting of polyethylene and copolymers of ethylene having a density of at least 0.935 g/cm³ and a melt index of at least 0.05 g/10 minutes, wherein the degree of crosslinking inwardly decreases across the thickness of said film, said film further having a longitudinal elongation of not more than 75% and a lateral elongation of 50 to 300%, said longitudinal elongation being lower than said lateral elongation.

2. An oriented and differentially crosslinked film of a material selected from the group consisting of polyethylene and copolymers of ethylene having a density of at least 0.935 g/cm³ and a melt index of at least 0.05 g/10 minutes, wherein the degree of crosslinking inwardly decreases across the thickness of said film, said film further having a longitudinal tearing strength of not more than 25 g/mm and a lateral tearing strength, said longitudinal tearing strength being lower than said lateral tearing strength.

3. A process for producing an oriented and differentially crosslinked film of a material selected from the group consisting of polyethylene and copolymers of ethylene comprising the steps of longitudinally stretching a resin sheet of a material selected from the group consisting of polyethylene and copolymers of ethylene having a density of at least 0.935 g/cm³ and a melt index of at least 0.05 g/10 minutes in which the degree of crosslinking inwardly decreases across the thickness thereof at a draw ratio of at least 5 times at a temperature of not higher than the melting point of a resin forming the resin sheet, and laterally stretching said sheet at a draw ratio of 4 to 8 times at a temperature ranging from above the melting point of the resin up to 10° C. higher than the melting point thereof.

* * * * *